(12) United States Patent
Noordhuis

(10) Patent No.: US 7,503,254 B2
(45) Date of Patent: Mar. 17, 2009

(54) PAD SUPPORT FOR A BEVERAGE MAKER, FOAM UNIT AND BEVERAGE MAKER COMPRISING SUCH A PAD SUPPORT, AND METHOD OF PREPARING A BEVERAGE WITH A FOAM LAYER USING SUCH A PAD SUPPORT

(75) Inventor: Joeke Noordhuis, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 685 days.

(21) Appl. No.: 10/527,358

(22) PCT Filed: Sep. 1, 2003

(86) PCT No.: PCT/IB03/03989

§ 371 (c)(1),
(2), (4) Date: Mar. 10, 2005

(87) PCT Pub. No.: WO2004/023948

PCT Pub. Date: Mar. 25, 2004

(65) Prior Publication Data

US 2005/0260310 A1    Nov. 24, 2005

(30) Foreign Application Priority Data

Sep. 13, 2002    (EP)    .................... 02078783

(51) Int. Cl.
*A47J 31/00*    (2006.01)

(52) U.S. Cl. ...................................... 99/295; 99/302 R
(58) Field of Classification Search .................. 99/295, 99/306, 302 R
See application file for complete search history.

(56) References Cited

U.S. PATENT DOCUMENTS

| | | | | |
|---|---|---|---|---|
| 3,490,356 | A * | 1/1970 | Peterson et al. | 99/300 |
| 3,610,132 | A * | 10/1971 | Martin et al. | 99/295 |
| 3,793,933 | A * | 2/1974 | Weber | 99/283 |
| 6,009,792 | A * | 1/2000 | Kraan | 99/295 |
| 6,021,705 | A * | 2/2000 | Dijs | 99/295 |
| 6,405,637 | B1 * | 6/2002 | Cai | 99/293 |

FOREIGN PATENT DOCUMENTS

EP    0 904 717 B1    3/1999

* cited by examiner

*Primary Examiner*—Reginald L Alexander

(57) ABSTRACT

A pad support for a beverage maker includes a bottom that forms a barrier for beverage liquid flowing from a supported pad, a discharge opening in the bottom for discharging beverage liquid through the bottom, and a nozzle restricting the discharge opening for generating a beverage liquid jet from the nozzle. Pad support projections are provided that have innermost support projections projecting from the bottom at positions circumferentially distributed around the discharge opening. Seen in top plan view towards the bottom, at least some of the innermost support projections have a cross-section that is elongate in a radial direction with respect to the discharge opening.

13 Claims, 4 Drawing Sheets

PAD SUPPORT FOR A BEVERAGE MAKER, FOAM UNIT AND BEVERAGE MAKER COMPRISING SUCH A PAD SUPPORT, AND METHOD OF PREPARING A BEVERAGE WITH A FOAM LAYER USING SUCH A PAD SUPPORT

The invention relates to a pad support according to the introductory portion of claim 1, to a foam unit and to a beverage maker comprising such a pad support, and to a method of preparing a beverage using such a pad support.

A pad support of the above type is known from European patent application 0 904 717. The pad support described in this document bounds a brewing chamber and comprises a plurality of studs. Distal ends of the studs support a filter wall of the pad or pouch preventing a granulate or powder—here ground coffee—from following the water that is pressed through the brewing chamber.

The jet of beverage liquid—here coffee extract—spouting through the nozzle causes the formation of bubbles in the coffee extract when the jet hits beverage liquid collected downstream of the nozzle. This results in a layer of foam on the beverage.

Coffee makers (apparatuses for preparing coffee extract from water and roasted and ground coffee) comprising such pad supports for forming foam on coffee extract are generally effective for forming foam at much lower pressures (for instance less than 3 bar and preferably about 0.8-1.6 bar) than those typically employed in espresso apparatuses and can therefore be manufactured at much lower cost.

A problem of such an apparatus is that sometimes ruptures occur in the pad close to the discharge opening. This causes the discharge opening to clog up with ground coffee, so that the dispensing of coffee extract is blocked. The ruptured filter pad then has to be removed, and the pad support must be cleaned. The coffee making process is terminated thereby without having provided the expected amount of coffee extract, and the removal of loose ground coffee and coffee extract that has been prevented from leaving the brewing chamber is cumbersome.

It is an object of the invention to provide a solution which, at a given strength of the filter wall of the pad and a given pressure drop across the filter wall, reduces the risk of the filter wall becoming forn and/or allows the pressure drop to be increased and/or the filter wall strength to be reduced without increasing the risk of filter wall rupture in an area close to the discharge opening, and to achieve this without substantially reducing the delicacy and permanence of the foam on the beverage.

According to the present invention, this object is achieved by providing a pad support according to claim 1. Furthermore, according to the invention, this object can be achieved by providing a foam unit according to claim 12 that comprises a pad support according to claim 1, in a beverage maker according to claim 13 that comprises a foam unit according to claim 12, and in a method of making a beverage according to claim 14 in which a pad support according to claim 1 is used.

Since, at least some of the innermost plurality of support projections seen in top plan view towards the bottom of the pad support, have a cross-section that is elongate in a radial direction with respect to the discharge opening, the innermost plurality of support projections can be positioned closer to the discharge opening, and thereby provide better support for the pad, without causing or increasing turbulence in the extract flow directly upstream of the nozzle, which would cause the delicacy and permanence of the obtained foam to suffer. Also, an increase in the volume between the pad and the nozzle is avoided, which increase would occur, for example, if the nozzle were positioned in the discharge opening in a position spaced away from and below the bottom, while innermost ones of the support projections project from the discharge opening or from a shoulder in the discharge opening.

The beverage to be prepared using the present invention will mostly be coffee. However, use of the invention in the preparation of other drinks involving the passage of liquid through a supported filter wall, such as cocoa and other milk-based drinks, is also possible.

Particularly advantageous embodiments of the invention are set forth in the dependent claims.

Further features, effects and details of the invention are described with reference to the embodiment shown in the drawings.

Figure 1:
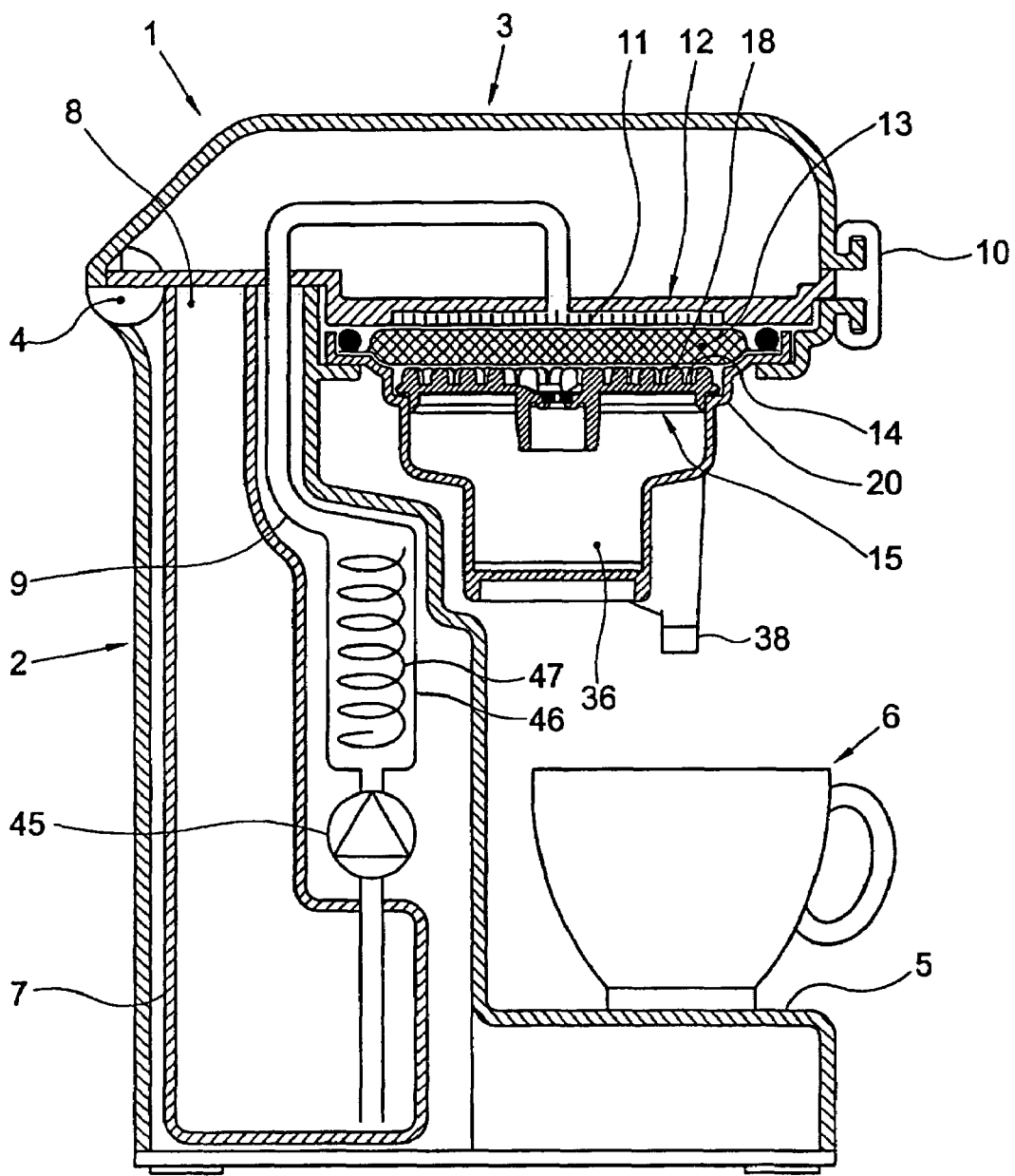
FIG. 1 is a view in cross-section of an example of a coffee maker according to the present invention comprising an example of a pad support according to the present invention.

In FIG. 1, reference numeral 1 designates a coffee maker according to the invention for preparing coffee extract having a foam layer with small-bubbles.

The coffee maker 1 has a housing 2 and a cover 3 hinged to the housing 2 by a hinge 4 and locked in a closed position by a latch 10. The housing 2 has a forward projecting portion of which a top surface 5 forms a plateau for supporting one or more cups 6 to be filled with coffee. Within the housing, a water reservoir 7 is located which is open at a top end 8 when the cover 3 is open and closed when the cover 3 is in the closed operating condition shown in FIG. 1. A conduit 9 extends through a heating chamber 46 in which an electric heating element 47 is arranged. For supplying water from the reservoir 8, a pump 45 is arranged in the conduit 9 upstream of the heater 47.

A sprinkling head 11 is integrated in a top wall 12 of a brewing chamber 13 and forms the end of the conduit 9. The top end of a pad support 15, which is also shown separately in FIGS. 3 and 4, forms a bottom 14 of the coffee brewing chamber 13 (see also FIG. 2). Support stubs 16, 17 project from the bottom, and spaces between these projections 16, 17 allow beverage liquid—in the present example coffee extract—pressed out of a pad or pouch 18 containing a ground coffee granulate or powder and supported above the bottom 14 to flow to a discharge opening 19 between the pad 18 and the bottom 14. The pad support 15 is supported by a brewing chamber housing part 20, which in its turn is supported by portions of the main housing 2 of the coffee maker 1. In operating condition, the brewing chamber 13 is sealed water-tight by seals 21, 37 so that no significant loss of pressure generated by the pump 45 occurs and all or virtually all pressure generated by the pump 45 is applied to the brewing chamber 13 when coffee is being extracted. If drinks other than coffee are to be prepared, the pad may contain, for example, other substances, such as cocoa powder and/or milk powder which may be flavored and/or sweetened.

A nozzle 22 of which an upwardly oriented face forms part of the bottom 14 restricts the cross-section of the discharge opening 19 available for the passage of coffee extract. The nozzle 22 may also be an integral part of the pad support 15.

The discharge opening 19 debouches into a dispersing chamber 36 that communicates with two dispensing channels extending through dispensing spouts 38 via which coffee extract dispersed in the chamber can flow to the cups 6 on the platform 5.

For forming foam on a coffee extract, the coffee extract is jetted from the nozzle 22 into a buffer quantity of coffee extract in the buffer reservoir 36.

Figure 2:
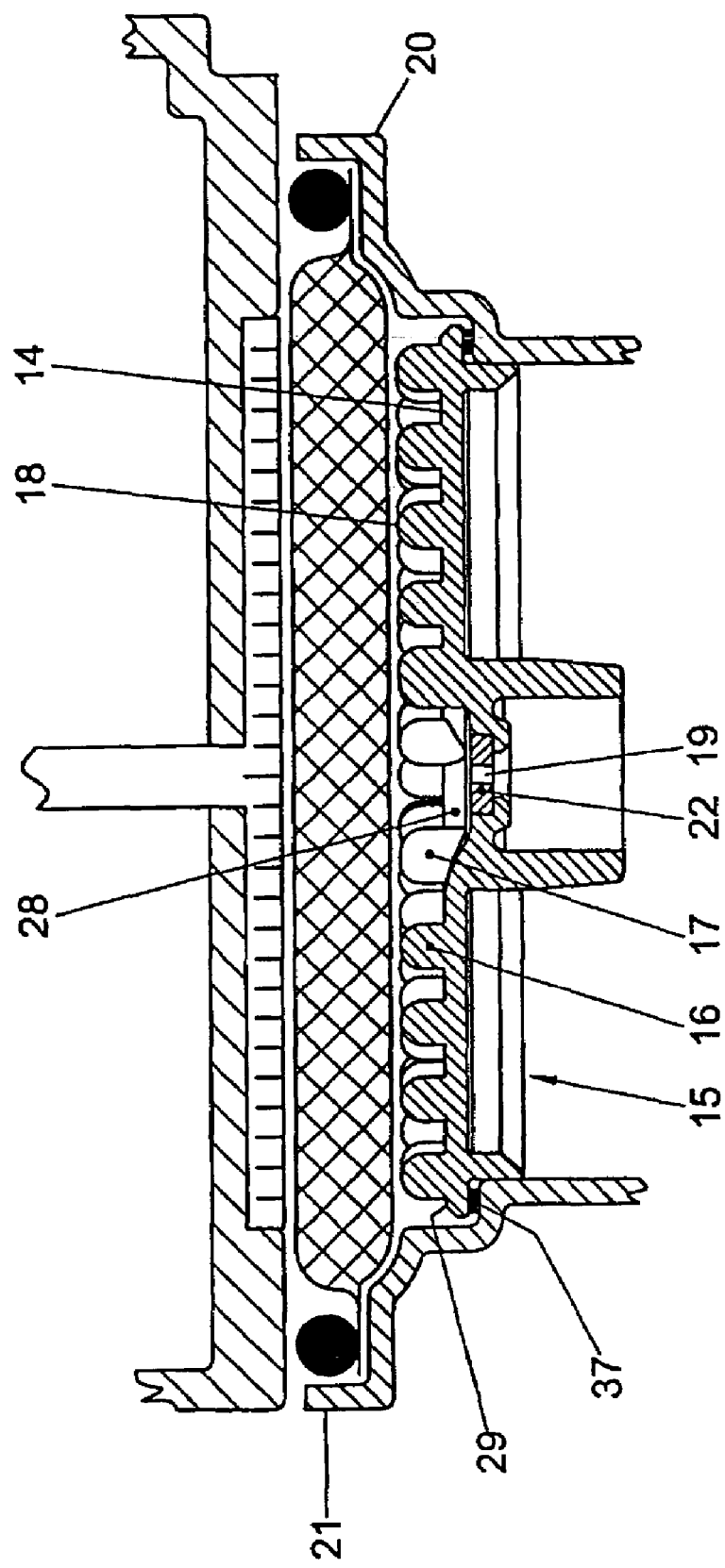
FIG. 2 is an enlarged view of a coffee brewing chamber of the coffee maker according to FIG. 1.
Figure 3:
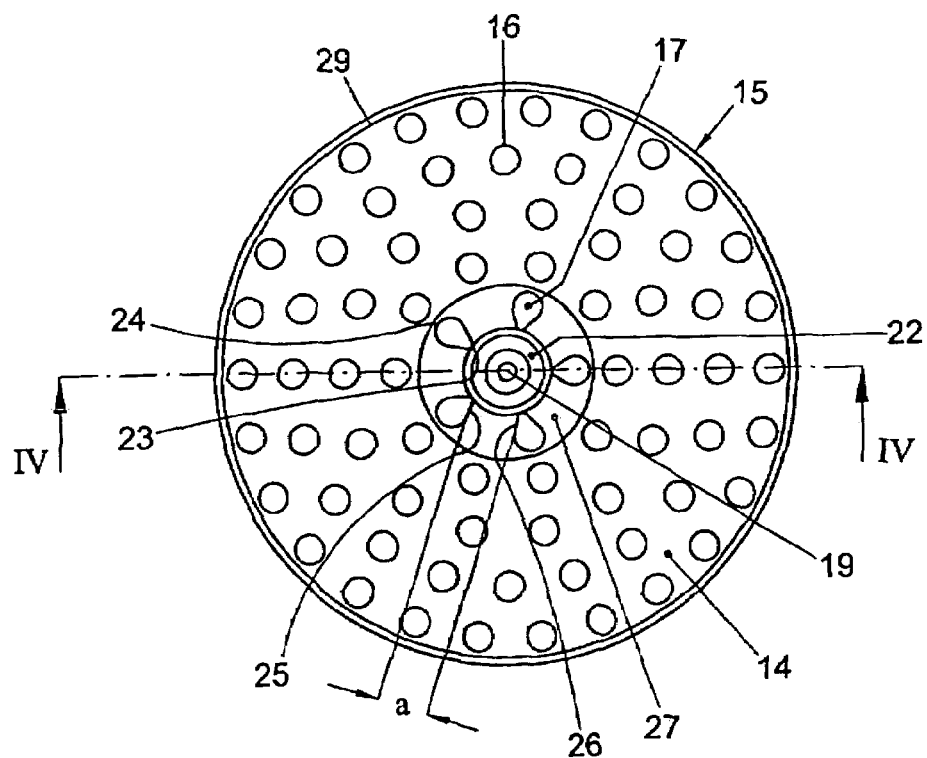
FIG. 3 is a top plan view of the pad support of the coffee maker according to FIGS. 1 and 2.
Figure 4:
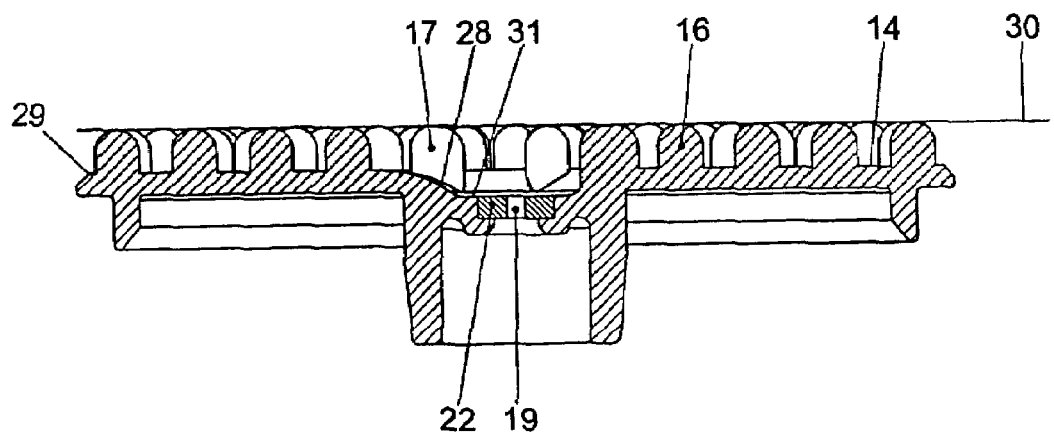
FIG. 4 is a cross-section taken on the line IV-IV in FIG. 3.

As is best seen in FIGS. 2-4, the pad support projections 16, 17 comprise an innermost plurality of support projections 17 projecting from the bottom 14 at positions circumferentially distributed around the discharge opening 19. Seen in plan view towards the bottom as in FIG. 3, the innermost ones 17 of the support projections 16, 17 have a cross-section that is elongate in a radial direction with respect to the discharge opening 19. This allows the innermost ones 17 of the support projections 16, 17 to be positioned closer to the discharge opening 19, and thus to provide better support for the filter pad 18 in the area of the discharge opening than would be possible if the innermost ones of the support projections were to have a conventional round cross-section, without causing turbulence in the coffee extract flow directly upstream of the nozzle 22, at least to an extent such that the delicacy and permanence of the obtained foam suffers.

It has been found that it is advantageous for obtaining a fine, stable, "crema"-type foam on the coffee if the coffee extract reaches the nozzle 22, from which it is jetted into coffee in the buffer reservoir 36, in a laminar flow. Various further features can be provided to promote this effect without entailing a substantial increase of the free volume between the filter pad 18 and the pad support 15, which would result in an increase in the amount of coffee extract that may be left in this volume after brewing, especially if relatively small amounts of coffee extract are prepared.

For a further counteracting of any turbulence, it is advantageous, for example, that the largest width of each innermost projection 17 is located radially outside of the middle of the length thereof in a direction radial to the discharge opening 19. Preferably, the largest width will be at 60 to 75% of the length of the cross-section if measured radially in outward direction.

Another feature which further helps to counteract turbulence in the area upstream of the nozzle 22 is that the elongate cross-sections each have an innermost end 23 that is sharper than the opposite, outermost end 24.

For improving the stability of the foam, it is further advantageous if neighboring ones of the innermost plurality of support projections 17 have straight wall portions 25, 26 facing each other and bounding a passage 27 between the neighboring projections 17 having a width "a" which is constant or decreases in radial direction towards the discharge opening 19.

More specifically, it is particularly advantageous for counteracting turbulence in the area upstream of the nozzle 22 if the elongate cross-sections of the innermost support projections 17 have a wing or droplet shape.

The distal ends of the support projections 16, 17 define a support bed 30 along which the pad, or at least the lower wall of a filter pad 18 extends when supported by the support projections 16, 17. In the present example, this support bed 30 is flat. However, other shapes, such as slightly curved or conical, are also conceivable.

It is advantageous for counteracting turbulence in the area upstream of the nozzle 22 if the distance between the bottom 14 and the support bed 30 increases radially towards the discharge opening 19, at least over a ring-shaped portion 28 of the bottom 14 surrounding the discharge opening 19 and radially spaced away from the outermost circumference 29 of the bottom 14, in particular in combination with innermost support projections 17 having a cross-section that is elongate in radial direction towards the discharge opening 19, but also in combination with innermost support projections of any other shape. This causes the coffee extract flow velocities in the center area of the pad support, where the flow velocities can be high enough to cause turbulence, to be reduced due to the increased cross-section through which the coffee-extract flows to the area upstream of the nozzle 22.

In order to reduce flow velocities selectively where turbulence is likely to occur and can affect foam formation, the bottom 14 surrounding the discharge opening 19 slopes more steeply in the ring-shaped portion 27 thereof than in portions of the bottom 14 located radially outside the ring shaped portion 14.

Since the innermost ones 17 of the support projections 16, 17 project from the ring-shaped bottom portion 27, the flow velocities are reduced particularly in the passages between the circle of innermost support projections 17, in which passages the flow velocities are highest, and before turbulence can be caused by a too fast outflow into the central area inside the circle of support projections 17.

It has further been found that it is advantageous for creating a stable, fine foam if a contraction process is caused whereby the coffee flow enters the nozzle 22. To this end, it is preferred that the bottom 14 also slopes more steeply in the ring-shaped portion 27 of the bottom 14 surrounding the discharge opening 19 than in bottom portions 31 (including the upwardly oriented face of the nozzle 22) between said ring shaped portion 27 and the discharge opening 19. This effect is particularly strong in to the present example, because the bottom 14 has a flat portion 31 between the sloping, ring-shaped portion 27 and the discharge opening 19.

Figure 6:
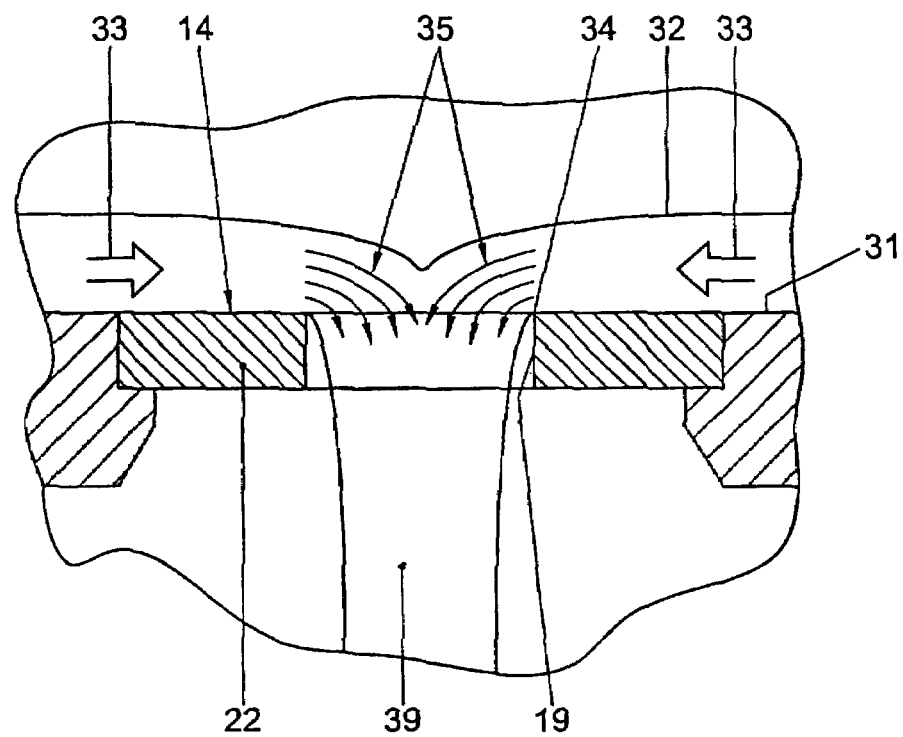
FIG. 6 is an enlarged view in cross-section taken on the line IV-IV in FIG. 3 of the nozzle area of the pad support according to FIGS. 1-4.

The contraction and its effect are illustrated in more detail in FIG. 6. In an area surrounding the discharge opening 19 and radially spaced away therefrom, a flow 32 of coffee extract flows radially towards the discharge opening 19 as indicated by broad arrows 33. More inwardly, in the area of an upstream edge 34 of the discharge opening 19, the coffee flow 32 bends around said upstream edge of the discharge opening 19 as indicated by groups of arrows 35. Due to the inward radial velocity of the coffee flow 32 in the area of the upstream edge 34 of the discharge opening 19, the coffee flow 32 does not follow the nozzle surface into the discharge opening 19, but separates from the nozzle surface at the upstream edge 34 of the discharge opening 19. Thus the upstream edge 34 of the discharge opening 19 effectively forms a separation edge where the coffee flow 32 comes off the nozzle surface.

This brings about that, in the discharge opening 19, the coffee flow 32 forming a jet 39 is not in contact with the internal surface of the discharge opening 19. Accordingly, it is not disturbed by hydrostatic and hydrodynamic drag along that surface, so a smooth jet 39 is obtained which was found to be very effective for causing the coffee extract to foam up when it hits the surface of a pool of coffee extract collected below the nozzle 22. It will be clear that a smooth laminar flow in the coffee extract reaching the discharge opening is important for a continuous, effective separation at the upstream edge 34 of the discharge opening 19 resulting in a smooth jet 39 of constant power and fineness hitting the pool of coffee extract collected downstream of the nozzle and thereby causing the formation of an even, fine foam on the coffee extract.

It is advantageous from a manufacturing point of view that, for obtaining a smooth jet, only the separation edge 34 needs to be sharp and smooth and manufactured to relatively narrow tolerances. The internal surface of the discharge opening 19 and the downstream end of the discharge opening may be manufactured to relatively wide tolerances and do not need to be particularly smooth. Such needs are particularly well matched by the characteristics of metal stamping, which allows the manufacture of nozzles at very low cost and at a high production rate. If the discharge nozzle is stamped out by a punch entering the metal blank from the side intended to form the upstream side of the nozzle, a smooth separation edge 34 of exact, preferably flat, circular shape can be obtained relatively easily. The punch cuts through the metal along about two thirds of the height of the hole for forming the discharge opening 19, thus providing a relatively smooth surface, so that contact with the coffee jet 39 passing closely by the upstream area of the internal surface of the discharge opening is ensured. Along about the final third of the height of the hole for forming the discharge opening, the metal is sheared off in a less orderly fashion, which results in a relatively rough surface and the formation of a burr. However, within relatively easily maintainable tolerance limits, such imperfections do not disturb the coffee flow 32, which passes along the downstream portions of the internal wall of the discharge opening 19 at a comparatively large distance.

To provide an effective flow separation at the leading edge 34 of the discharge opening, said edge is preferably sharp. The sharpness achievable by punching from the upstream side without post-processing of the edge to make it more or less sharp is usually sufficient. A suitable sharpness may also be achieved in other manners, for instance by drilling, grinding, or by die casting or injection molding of the nozzle. The nozzle may also be made from ceramic material, provided this is fine enough to provide the required smoothness of the upstream separation edge 34.

To avoid that the jet 39 contacts the internal surface of the discharge opening in an area spaced downstream from the separation edge 3, the height of the discharge opening 19 is preferably smaller than its smallest cross-sectional width, and more preferably smaller than half its smallest cross-sectional width. According to the presently most preferred example, the discharge opening 19 has a diameter of 0.6 to 1.0 mm and a height of 0.2 to 0.4 mm, and the radius of the separation edge 34 is preferably less than 0.1 mm. If the discharge opening 19 flares outwardly towards its downstream end instead of being of constant cross-section as in the present example, it may be longer without causing contact between the jet 39 and its internal surface.

Figure 5:
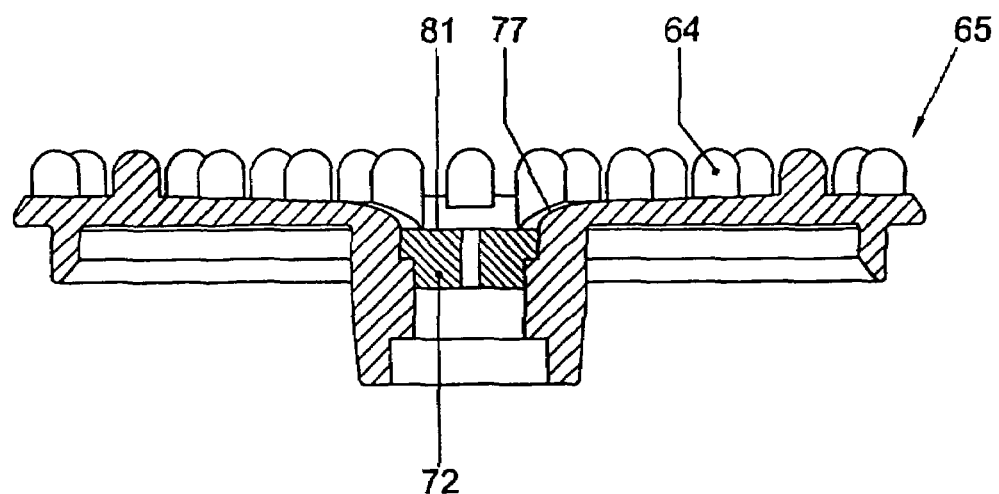
FIG. 5 is a cross-section of an alternative example of a pad support according to the invention.

FIG. 5 shows an alternative example of a pad support 65 according to the invention. According to this example, the bottom 64 gradually slopes inwardly and away from the distal ends of the support projections towards a ring-shaped portion 77 where the bottom 64 slopes more steeply to reduce flow velocities with which the coffee extract flows out towards the area upstream of the nozzle 72. The nozzle 88 has a flat upstream face 81, which forms a flat innermost portion of the bottom 64, so that an effective, foam-enhancing contraction of coffee extract immediately upstream of the nozzle 22 is achieved.

The invention claimed is:

1. A pad support for a beverage maker, comprising a bottom forming a barrier for beverage liquid flowing from a supported pad, a discharge opening in said bottom for discharging beverage liquid through said bottom, and a nozzle restricting said discharge opening for generating a beverage liquid jet from said nozzle, and a plurality of pad support projections comprising an innermost plurality of said support projections projecting from said bottom at positions circumferentially distributed around said discharge opening, wherein, seen in top plan view towards said bottom, at least some from among said innermost plurality of support projections have a cross-section that is elongate in a radial direction with respect to said discharge opening, and wherein said cross-section has a length in a radial direction with respect to said discharge opening and has a largest width located radially between a middle of said length in a radial direction with respect to said discharge opening and an outer end of said length.

2. The pad support according to claim 1, wherein said elongate cross-sections each have an innermost end and an outermost end, the innermost end being sharper than the outermost end.

3. The pad support according to claim 1, wherein neighboring ones from among said innermost plurality of support projections have straight wall portions facing each other, thus bounding a passage between said neighboring projections having a width which is constant or decreases in radial direction towards said discharge opening.

4. The pad support according to claim 1, wherein said cross-sections elongate in a radial direction with respect to said discharge opening are wing or droplet-shaped.

5. The pad support according to claim 1, wherein distal ends of said support projections define a support bed for supporting said pad, wherein said bottom has an outermost circumference, and wherein the distance between said bottom and said support bed increases in radial directions towards said discharge opening at least in a ring-shaped portion of said bottom surrounding said discharge opening and radially and inwardly spaced away from said outermost circumference.

6. The pad support according to claim 5, wherein, in said ring-shaped portion of said bottom, said bottom slopes more steeply than in bottom portions radially outside said ring-shaped bottom portion.

7. The pad support according to claim 5, wherein said innermost plurality of support projections project from said ring-shaped bottom portion.

8. The pad support according to claim 5, wherein, in said ring-shaped portion of said bottom surrounding said discharge opening, said bottom slopes more steeply than in bottom portions between said ring-shaped portion and said discharge opening.

9. The pad support according to claim 5, wherein said bottom has a flat portion between said ring-shaped portion and said discharge opening.

10. The pad support according to claim 1, wherein the discharge opening has a sharp upstream separation edge forming a transition from said bottom to said discharge opening for causing a separation of beverage liquid from the discharge opening as the beverage liquid flows into the discharge opening.

11. A foam unit comprising the pad support according to claim 1 and a buffer reservoir positioned downstream of the nozzle for retaining a buffer quantity of beverage liquid such that, in operation, beverage liquid is jetted from the nozzle into the buffer quantity of beverage liquid.

12. A beverage maker comprising: a water heating and feeding structure communicating with a brewing chamber for feeding hot water under pressure towards said brewing chamber; the foam unit according to claim 11; and a beverage dispensing passage communicating with said buffer reservoir, wherein the pad support bounds a bottom side of said brewing chamber.

13. A method of preparing a beverage with a foam layer, comprising steps of forcing water through a granulate or powder upstream of a filter wall of a pad and of receiving the beverage from the pad using the pad support according to claim 1, the beverage liquid flow being such that a laminar flow pattern is obtained in an area directly upstream of said discharge opening.

* * * * *